United States Patent [19]

Sato et al.

[11] Patent Number: 4,901,158

[45] Date of Patent: Feb. 13, 1990

[54] VERIFICATION STAMP EQUIPMENT

[75] Inventors: Siro Sato, Hachioji; Kazuyuki Nishino, Ageo; Shiro Hatakeyama, Tokyo, all of Japan

[73] Assignee: Konica Corporation, Tokyo, Japan

[21] Appl. No.: 302,176

[22] Filed: Jan. 26, 1989

[30] Foreign Application Priority Data

Jan. 30, 1988 [JP] Japan .................................. 63-11714

[51] Int. Cl.⁴ ........................ G01D 15/20; B41J 27/00
[52] U.S. Cl. ...................................... 358/296; 346/78;
  346/94; 358/305; 101/103; 101/327
[58] Field of Search ........................... 346/78, 94, 141;
  358/296, 305; 101/DIG. 2, 93.47, 327, 287, 103;
  355/133

[56] References Cited
U.S. PATENT DOCUMENTS
3,380,378  4/1968  Edwards .............................. 101/103

Primary Examiner—B. A. Reynolds
Assistant Examiner—Scott A. Rogers
Attorney, Agent, or Firm—Finnegan, Henderson, Farabow, Garrett and Dunner

[57] ABSTRACT

Disclosed is a stamping device for use in facsimile equipment, wherein a document has a mark stamped hereon after its information has been transmitted. The stamp device is composed of a stamp body which has a stamp face for marking the document and a handling knob; a mounting plate for detachably holding the stamp body; and a solenoid for moving the mounting plate, whereby the stamp face is pressed onto the document so as to stamp the mark. The stamp body and the mounting plate are shaped so that the stamp body is engaged with a freely removed from the mounting plate by using the knob of the stamp body.

7 Claims, 4 Drawing Sheets

VERIFICATION STAMP EQUIPMENT

BACKGROUND OF THE INVENTION

This invention is related to verification stamp equipment used in facsimiles and other equipment for information signal transmission through telecommunication lines.

Use of facsimile equipment is becoming more popular as a means of information signal transmission.

FIG. 8 shows the facsimile equipment. The equipment is configured to allow original 19 placed on original-setting table 3 to be fed inside casing 2 of the equipment.

A means 10 for reading an original and a means 20 for recording image data on recording paper 21 are installed inside the casing (main body) 2.

The figure shows that original-setting table 3 protrudes so as to incline from the lower left to the upper right of casing 2, and an original and an identification sheet (hereinafter called original 19 unless otherwise specified) placed on original-setting table 3 are fed to optical reader 10.

Original 19 inside the casing is then fed downward by feed roller 4. Before it reaches sheet ejection rollers 5 and 6, the type of paper of the original is identified and the original image is read.

To perform this reading, fluorescent lamp 11 is installed between feed roller 4 and a pair of sheet ejection rollers 5 and 6 to irradiate the surface of the original with light rays. Reflected light (optical-image information) thus obtained is led through a pair of mirrors 12 and 13 and lens system 14, which are installed at the bottom of casing 2, to image read device 15. Image read device 15 converts optical-image information into electrical signals (image signals). The image signal is stored through an image processing system (not shown) or is output to a telecommunication line.

For the image read device, a line sensor consisting of CCD and some other charge transfer device may be used. Numeral 17 in the figure shows a mounting plate for CCD 15.

Original 19 is carried downward at a specified speed, then an image information thereon is read line by line and sequentially converted into image signals.

The original fed at a specified speed is held by the pair of sheet ejection rollers 5 and 6 and is ejected from the front bottom side of casing 2 to an original-receive tray (not shown in the figure).

Recorder 20 reproduces information as a visible image on record paper 21 on the basis of a received image signal or a read image signal to be copied. Recorder 20 is installed at the upper rear of casing 2.

For recording, roll of paper (record paper) 21 is installed so as to revolve freely in the center of casing 2 and record paper 21 is fed by platen roller 22.

Recording device 23 is in sliding contact with platen roller 22. As the recording device, a thermal head having a plurality of heating elements arranged in lines may be used.

Therefore, a received image is recorded on record paper 21 as it passes recording device 23 on the surface of platen roller 22. If recording paper 21 recorded with the image information is carried forward for a specified length, an automatic cutter 24 is actuated and the rear edge of recording paper 21 is automatically cut. Automatic cutter 24 comprises paper-cutting edges 26a and 26b, and a mechanism for driving them upward and downward (not shown).

Automatically cut recording paper 21 is ejected onto sheet ejection tray 25 installed at the rear of casing 2.

The facsimile equipment described above has a problem in that the user on the transmission side is unable to check whether the transmission of original 19 has been transmitted normally. To solve this problem, the facsimile equipment is installed with a verification stamp device which impresses a verification stamp on the back of transmission original 19 when transmission was completed normally.

Since this type of verification stamp device is installed only in top-of-the-line class machines, the stamp device is always replaced by a specialist serviceman in the course of strong maintenance support usually given to these machines.

Moreover, since the verification stamp device has a longer service life than that of the machine, there is no need to replace the stamp device earlier than the maintenance work for the machine.

Users, therefore, need not replace the verification stamp device.

To replace it, however, a part of the equipment in casing 2 has to be removed, requiring highly complex work.

In short, it is extremely difficult for user to replace the verification stamp device by himself.

At present, with the advancement of technology, the life of the machine is becoming longer and the need for replacing the verification stamp is growing.

Under the circumstances, a user is likely to be inconvenienced if the verification stamp device cannot be replaced by anyone other than a special serviceman.

SUMMARY OF THE INVENTION

Accordingly, the present invention aims to overcome the disadvantages in conventional facsimile technology by providing a simpler machine configuration and a verification stamp device which can be replaced very easily.

This aim is accomplished by providing a verification stamp device as one embodiment of the present invention. The verification stamp device is characterized by comprising a stamp base having grooves and a knob for removal and insertion;
  a mounting member having protrusions to fit the stamp base grooves; and
  a driving device for moving the mounting member;
    wherein the stamp base is mounted to the mounting member so as to be freely removable.

In the present invention, original 19 is ejected after its information has been read through the passage in the machine as shown by the dotted lines in FIG. 3.

Verification stamp device 50 is installed near sheet ejection rollers 5 and 6.

Drive means 41 of verification stamp device 50 turns on if original 19 is transmitted normally.

Drive means 41 moves mounting member 42 to the side of sheet ejection roller 5, and ink-impregnated stamp face 40a is impressed against the specified position of original 19 which has been transmitted (see FIG. 4).

In the abovementioned verification stamp device 50 wherein stamp base 40 is installed as being freely removable, accordingly, when replacing verification stamp device 50, only replacing stamp base 40 may be permissible.

To replace stamp base 40, knob 40b of stamp base 40 is pulled down while verification stamp device 50 is in idle state; then protrusion 40d on stamp base 40 is released from engagement with a fitting edge 42c of mounting member 42 (locking is released) and stamp base 40 is removed from mounting member 42 (see FIG. 7).

Moreover, to install stamp base 40, grooves 40f of stamp base 40 are fitted to edge 42c of mounting member 42 and stamp base 40 is pushed to the side of drive means 41 until it reaches the specified position.

Consequently, stamp base 40 is fixed by its protrusion 40d to the mounting member 42.

Since stamp base 40 and mounting member 42 are fitted to be freely removable with each other, the verification stamp device, that is the stamp base, can be replaced quite easily.

This enables users to replace the device easily without asking for the assistance of a specialist serviceman.

DETAILED DESCRIPTION OF THE INVENTION

While the verification stamp device of the present invention may be used in any application of facsimile equipment, verification stamp device 50 of the present invention will be described in detail in its application to facsimile equipment using telecommunication lines (see FIG. 1 and others).

Figure 1:
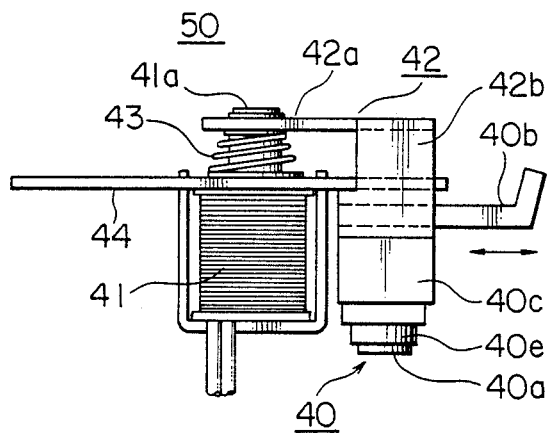
FIG. 1 is a side view showing the configuration of the verification stamp device of the present invention.

FIG. 1 shows the configuration of verification stamp device 50.

Figure 8:
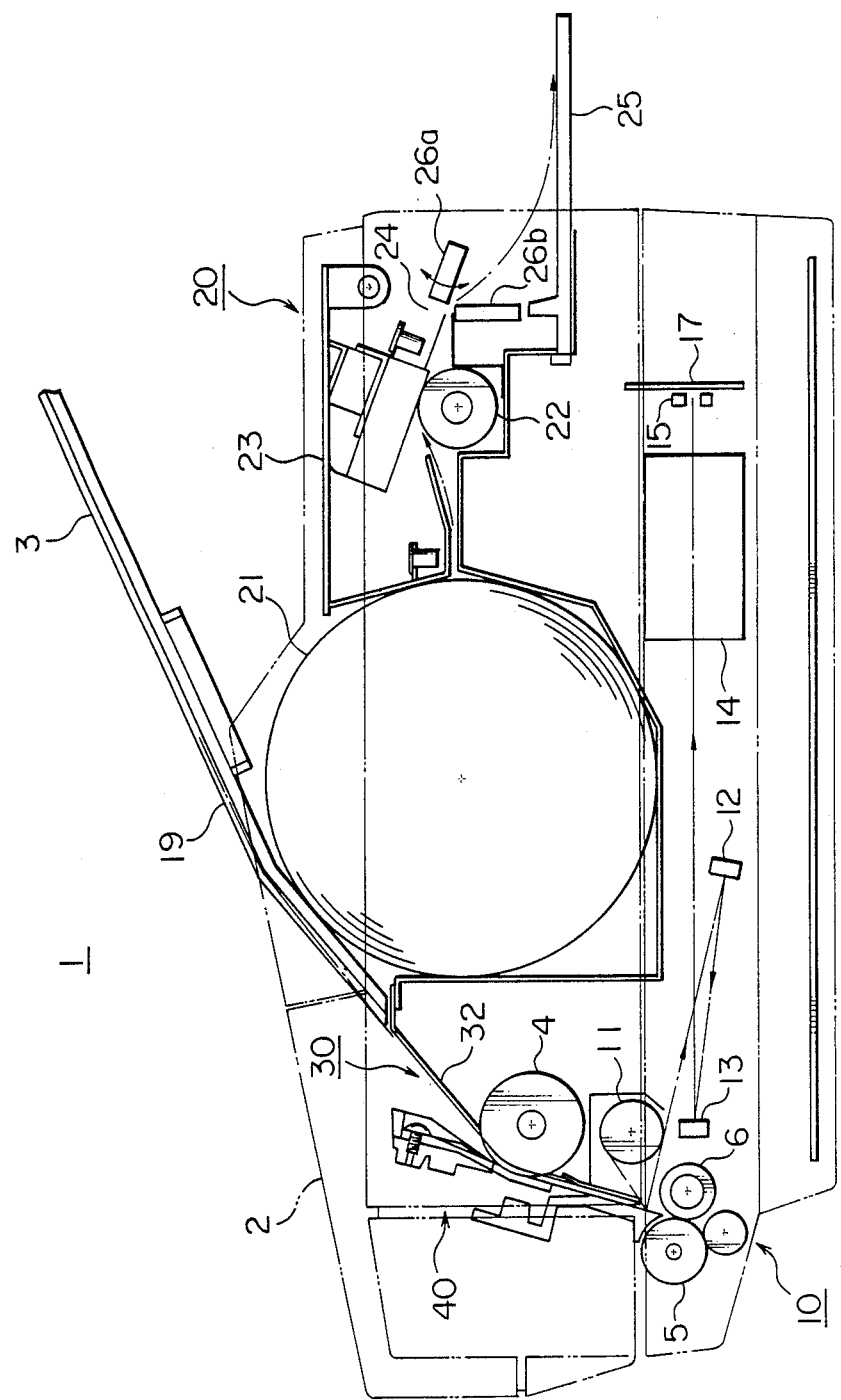
FIG. 8 is a side view showing the total outline of a facsimile equipment to which the present invention is applicable.

Verification stamp device 50 is installed near sheet ejection rollers 5 and 6 shown in FIG. 8.

FIG. 1 shows that verification stamp device 50 is configured with verification stamp base 40, solenoid 41 which is a drive means for driving stamp base 40, slider 42 which is an attaching means for mounting detachably stamp base 40, coil spring 43 for returning slider 42 to the original position, providing solenoid 41 turns off, and mounting plate 44 for fixing solenoid 41 and slider 42 to facsimile equipment 1.

Movable shaft 41a consisting of an iron core is installed in solenoid 41 to which an end of slider 42 is attached. This enables slider 42 to move toward the axial direction of movable shaft 41a by a specified distance in response to the energization or deenergization of solenoid 41.

Figure 2:
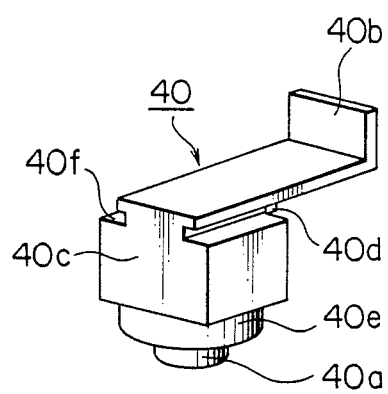
FIG. 2 is a perspective side view showing the configuration of the stamp base of the verification stamp device of the present invention.

Stamp base 40 is made of resin material and integrally configured, as shown in FIG. 2, with L-shaped knob 40b and stamp base main body 40c; and, to both sides of which groove 40f is configured to fit to end 42c of slider 42. Protrusion 40d is formed with groove 40f at the side of knob 40b.

Moreover, metal stamp pad 40e is mounted to stamp base main body 40c.

At the end of the stamp pad 40e is attached stamp face 40a with an adhesive agent, stamp face 40a is formed into a specified shape using rubber or some other elastic material and is impregnated with ink.

The stamp face may be configured as a circular mark or a character marked "Finished".

Upon detecting that original 19 has been transmitted normally, solenoid 41 becomes ON-state and drives slider 42.

End portion 42c of U-shaped section 42b of slider 42 is formed so as to engage with groove 40f of stamp base 40 when the latter is installed.

Figure 5:
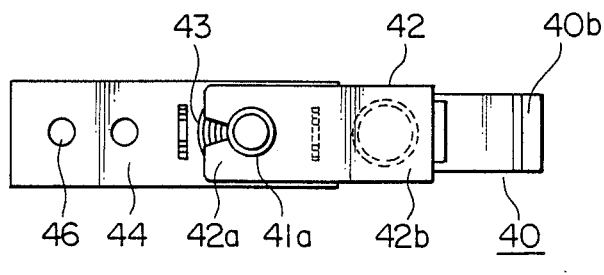
FIG. 5 is a plan view of the verification stamp device of the present invention.
Figure 3:
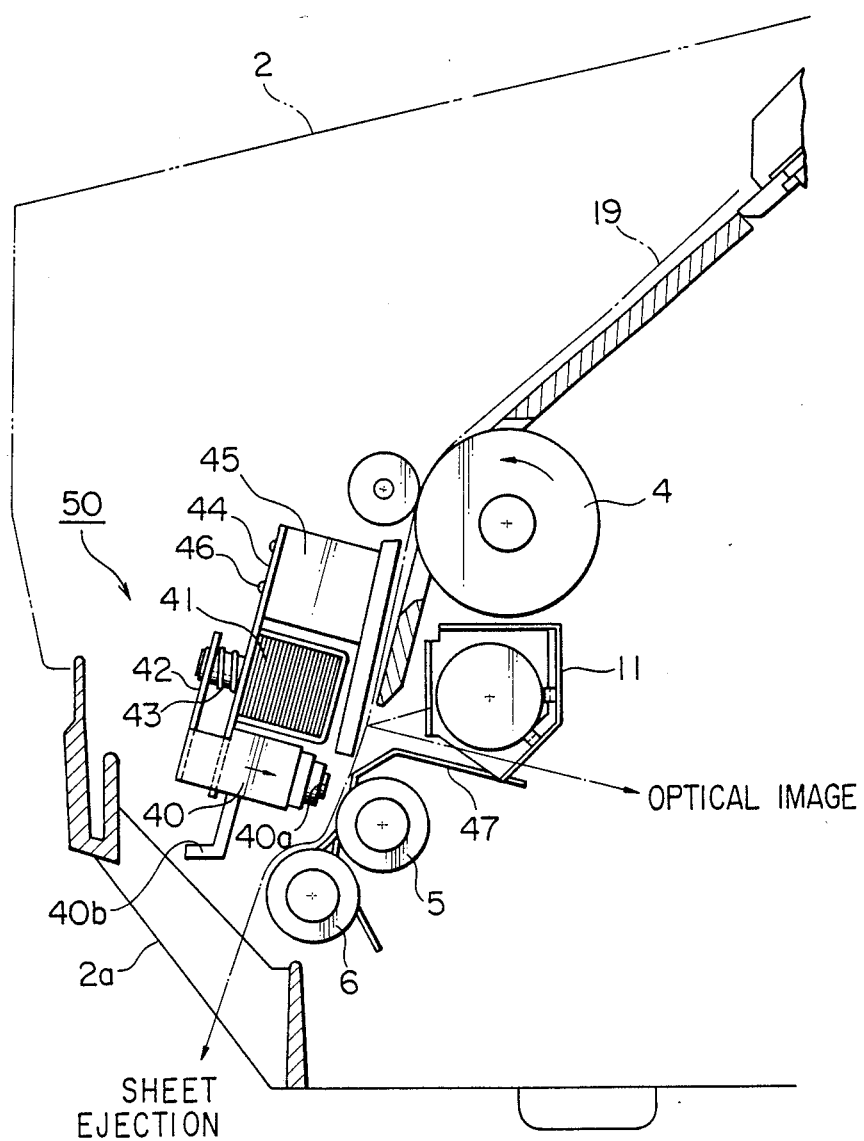
FIG. 3 is a main side view showing the verification stamp device of the present invention installed on the facsimile equipment.

Verification stamp device 50 of the above configuration is attached with screws onto guide 45 via mounting plate 44 of verification stamp device 50 as shown in FIGS. 3 and 5.

Guide plate 47 for original 19 installed on the side of sheet ejection rollers 5 and 6 maintains the distance against stamp face 40a within the stroke of solenoid 41; it is installed approximately in parallel to the stamp face after setting in advance relative positional relations. In the configuration described above, the verification stamp device is operated as follows:

If original 19 is transmitted normally, solenoid 41 of verification stamp device 50 is turned on.

Figure 4:
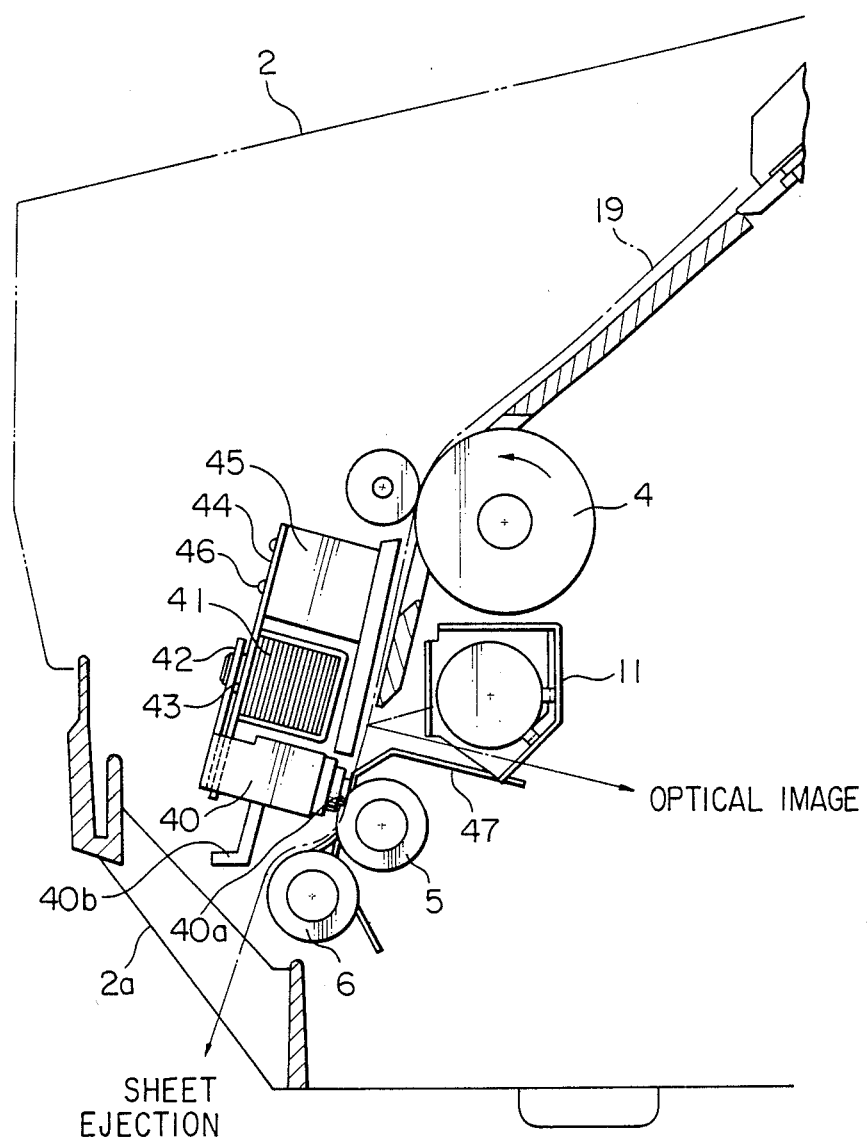
FIG. 4 is a main side view showing the stamp face being pressed against the original.

As a result, slider 42 is attracted toward mounting plate 44. Consequently, as shown in FIG. 4, with the movement of slider 42, stamp base 40 is transferred toward guide plate 47, and stamp face 40a is pressed against original 19 as the latter is carried onto guide plate 47, completing the impression of stamp mark. Stamping is done on the back of original 19—outside the text area.

After stamp base 40 is pressed against original 19, solenoid 41 turns off.

When solenoid 41 turns off, slider 42 is moved back to the original position by the force of coil spring 43.

Figure 6:
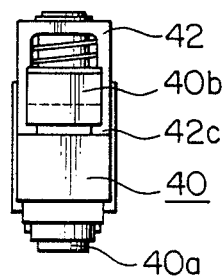
FIG. 6 is the right-hand side view of the verification stamp device of the present invention.
Figure 7:
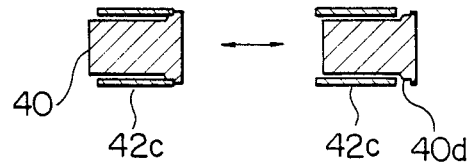
FIG. 7 is a main sectional view showing the stamp base and the mounting member of the present invention in a locking state.

In the above verification stamp device 50, a mechanism for replacing stamp base 40 is described; see FIGS. 6 and 7.

FIG. 6 shows end 42c being engaged with groove 40f of stamp base 40.

In this state, protrusions 40d installed at the ends of grooves 40f are elastically clamped and its movement is restricted by slider 42b as shown in FIG. 7.

Consequently, stamp base 40 is locked to slider 42.

The stamp base is replaced as follows: FIG. 3 shows knob 40b is just inside the sheet ejection port and can be reached by hand.

Therefore, if knob 40b is pulled toward sheet ejection port 2a while verification stamp device 50 is idle, protrusion 40d is released from elastically clampling by slider 42b.

Consequently, stamp base 40 only can be removed from verification stamp device 50 as shown in FIG. 2.

To install new stamp base 40, end 42c of slider 42 is engaged to grooves 40f of the stamp base and knob 40b is pushed toward solenoid 41.

Protrusion 40d elastically is inserted into slider 42, thereby locking stamp base 40 in slider 42, then the replacement operation is completed. Since stamp base 40 can be easily installed to slider 42 as described above, the replacement of stamp base 40 in verification stamp device 50 can be done quite easily. Moreover, the replacement time can be reduced considerably.

The color of knob 40b of stamp base 40 is not specified in the embodiments; however, it may have a different color from the surrounding equipment to prevent misoperation.

So far described, the verification stamp device of this invention comprises the following:

A stamp base having grooves for removal and installation and a knob for removal and insertion; a mounting member having protrusions to fit the stamp base grooves; and a driving device for moving the mounting member; and the stamp device is characterized in that the stamp base is removable from the mounting member to which it is installed.

Advantages of the configuration of this invention consists in the fact that in lieu of replacement of the whole verification stamp device, only the stamp base has to be replaced since the latter is freely removable from the mounting member to which it is installed; that the replacement cost is less expensive; and that someone other than a serviceman can replace the device since it only requires the removal and installation of a stamp base.

Moreover, time required for replacing the verification stamp device can be reduced considerably.

The verification stamp device of this invention is therefore quite useful in applications in the aforementioned facsimile equipment.

What is claimed is:

1. A stamping apparatus for use in a facsimile machine apparatus for stamping a document with a mark, comprising:

stamp means having a stamp face for marking a document;

slider means for detachably holding the stamp means, the stamp means being removable from the slider means by applying a removing force along a removing direction and being insertable into the slider means by applying an inserting force along an inserting direction;

driving means in fixed relation to the facsimile machine for moving the slider means relative to the facsimile machine between a first position, wherein the stamp face is spaced from the document, and a second position, wherein the stamp face is in engagement with the document; and mounting means for mounting said driving means to the facsimile machine.

2. A stamping apparatus as claimed in claim 1, wherein the stamp means further includes a knob through which the removing force and the inserting force is applied to the stamp means.

3. A stamping apparatus as claimed in claim 1, wherein said stamp face includes a permanently inked surface.

4. A stamping apparatus as claimed in claim 1, wherein the stamp means is held by the slider means by essentially static friction.

5. A stamping apparatus as claimed in claim 1, wherein said driving means is a solenoid including a coil and a core, the coil being fixed to said mounting means and said core engaging said slider means.

6. A stamping apparatus as claimed in claim 5, wherein said driving means is in the first position when the coil is de-energized and in the second position when the coil is energized.

7. A stamping apparatus as claimed in claim 6, further including a spring to move the stamp face away from the document when the coil is de-energized.

* * * * *